US009122524B2

(12) United States Patent
Mathur et al.

(10) Patent No.: US 9,122,524 B2
(45) Date of Patent: Sep. 1, 2015

(54) IDENTIFYING AND THROTTLING TASKS BASED ON TASK INTERACTIVITY

(71) Applicant: Microsoft Corporation, Redmond, WA (US)

(72) Inventors: Siddhartha Mathur, Sammamish, WA (US); David A. Sterling, Apex, NC (US); Lu Yang, Beijing (CN); Zhengwen Zhu, Redmond, WA (US); David Nunez Tejerina, Bellevue, WA (US); Ozan Ozhan, Kirkland, WA (US); Michael Butler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 13/736,080

(22) Filed: Jan. 8, 2013

(65) Prior Publication Data

US 2014/0196048 A1    Jul. 10, 2014

(51) Int. Cl.
*G06F 9/48* (2006.01)
(52) U.S. Cl.
CPC .............. *G06F 9/4893* (2013.01); *G06F 9/485* (2013.01); *Y02B 60/144* (2013.01)
(58) Field of Classification Search
None
See application file for complete search history.

(56) References Cited

U.S. PATENT DOCUMENTS

| | | | |
|---|---|---|---|
| 4,642,756 A | 2/1987 | Sherrod | |
| 5,109,512 A | 4/1992 | Bahr et al. | |
| 5,375,244 A | 12/1994 | McNair | |
| 5,515,538 A | 5/1996 | Kleiman | |
| 5,774,718 A | 6/1998 | Aoshima et al. | |
| 6,477,561 B1 | 11/2002 | Robsman | |
| 6,701,311 B2 | 3/2004 | Biebesheimer et al. | |
| 6,754,664 B1 | 6/2004 | Bush | |
| 6,829,713 B2 * | 12/2004 | Cooper et al. ................ 713/320 |
| 7,165,088 B2 | 1/2007 | Cohen et al. | |
| 7,206,845 B2 | 4/2007 | Banning et al. | |
| 7,254,607 B2 | 8/2007 | Hubbard et al. | |
| 7,353,538 B2 | 4/2008 | Sample | |
| 7,783,666 B1 | 8/2010 | Zhuge et al. | |
| 7,802,238 B2 | 9/2010 | Clinton | |
| 7,840,647 B2 | 11/2010 | Kloba et al. | |

(Continued)

OTHER PUBLICATIONS

Grimm, et al., "Na Kika Secure Service Execution and Composition in an Open Edge-Side Computing Network", Retrieved at <<http://static.usenix.org/event/nsdi06/tech/full_papers/grimm/grimm.pdf>>, in the Proceedings of the 3rd Symposium on Networked Systems Design and Implementation (NSDI '06), May 8, 2006, pp. 14.

(Continued)

*Primary Examiner* — Emerson Puente
*Assistant Examiner* — Jonathan R Labud
(74) *Attorney, Agent, or Firm* — Louise Bowman; Danielle Johnston-Holmes; Micky Minhas

(57) ABSTRACT

The described implementations relate to processing of electronic data. One implementation is manifest as a system that can include logic and at least one processing device configured to execute the logic. The logic can be configured to receive a first task request to execute a first task that uses a resource when performed. The first task can have an associated first level of interactivity. The logic can also be configured to receive a second task request to execute a second task that also uses the resource when performed. The second task can have an associated second level of interactivity. The logic can also be configured to selectively throttle the first task and the second task based upon the first level of interactivity and the second level of interactivity.

20 Claims, 8 Drawing Sheets

(56) References Cited

U.S. PATENT DOCUMENTS

| | | | |
|---|---|---|---|
| RE42,153 | E | 2/2011 | Hubbard et al. |
| 8,103,769 | B1 | 1/2012 | Weiser et al. |
| 8,112,768 | B2 | 2/2012 | Wu |
| 8,190,593 | B1 | 5/2012 | Dean |
| 8,250,196 | B2 | 8/2012 | Demir et al. |
| 8,312,073 | B2 | 11/2012 | Jakobsson |
| 8,468,251 | B1 | 6/2013 | Pijewski et al. |
| 2002/0138643 | A1 | 9/2002 | Shin et al. |
| 2006/0090163 | A1 | 4/2006 | Karisson et al. |
| 2006/0135258 | A1 | 6/2006 | Maheshwari et al. |
| 2006/0190482 | A1 | 8/2006 | Kishan et al. |
| 2006/0294228 | A1 | 12/2006 | Almstrom |
| 2007/0118653 | A1 | 5/2007 | Bindal |
| 2007/0233693 | A1 | 10/2007 | Baxter et al. |
| 2007/0233694 | A1 | 10/2007 | Baxter |
| 2007/0234327 | A1 | 10/2007 | Baxter et al. |
| 2008/0120620 | A1 | 5/2008 | Lett et al. |
| 2008/0240144 | A1 | 10/2008 | Kruse et al. |
| 2009/0055829 | A1* | 2/2009 | Gibson .......................... 718/103 |
| 2009/0100435 | A1 | 4/2009 | Papaefstathiou et al. |
| 2009/0172191 | A1 | 7/2009 | Dumitriu et al. |
| 2010/0043004 | A1 | 2/2010 | Tambi et al. |
| 2010/0205607 | A1 | 8/2010 | Shivanna et al. |
| 2010/0268798 | A1 | 10/2010 | Kourkouzelis et al. |
| 2011/0087776 | A1 | 4/2011 | Tabone et al. |
| 2011/0153724 | A1 | 6/2011 | Raja et al. |
| 2011/0153828 | A1 | 6/2011 | Park et al. |
| 2011/0161488 | A1* | 6/2011 | Anderson et al. ............. 709/224 |
| 2011/0161964 | A1 | 6/2011 | Piazza et al. |
| 2011/0173038 | A1 | 7/2011 | Moon et al. |
| 2012/0030339 | A1 | 2/2012 | Dumitriu et al. |
| 2012/0110572 | A1 | 5/2012 | Kodi et al. |
| 2012/0143992 | A1 | 6/2012 | Salamatov |
| 2012/0174121 | A1* | 7/2012 | Treat et al. .................... 719/318 |
| 2013/0152097 | A1 | 6/2013 | Boctor et al. |
| 2013/0185427 | A1 | 7/2013 | Sterling et al. |

OTHER PUBLICATIONS

"What's Behind Network Downtime", Retrieved at <<http://www-935.ibm.com/services/sg/gts/pdf/200249.pdf>>, May 2008, pp. 12.

"New-Workflow—MakeItEasy Authoring Workflows using PowerShell Extended Syntax", Retrieved at <<http://roualin.fr/new-workflow-makeiteasy-authoring-workflows-using-powershell-extended-syntax-2/>>, Jul. 21, 2012, pp. 6.

Cobb, Michael, "Using Resource Allocation Management to Prevent DOS and other Attacks", Retrieved at <<http://searchsecurity.techtarget.co.uk/tip/0,289483,sid180_gci1507648,00.html>>, Mar. 31, 2010, pp. 16.

Osborn, Stu, "Determining Health and Wellness of an OCS Deployment—IM and Presence", Retrieved at <<http://blogs.technet.com/b/nexthop/archive/2008/07/28/determining-health-and-wellness-of-an-ocs-deployment-im-andpresence.aspx>>, Jul. 2008, pp. 5.

"How BizTalk Server Implements Host Throttling", Retrieved at <<Ahttp://msdn.microsoft.com/en-us/library/aa559893(v=BTS.70).aspx>>, Retrieved Date: Oct. 19, 2011, pp. 13.

Anderson, et al., "Insider Attack and Real-Time Data Mining of User Behavior", Retrieved at <<http://ieeexplore.ieee.org/stamp/stamp.jsp?tp=8,arnumber=5388654>>, Proceedings of IBM Journal of Research and Development, vol. 51, No. 3/4, May/Jul. 2007, pp. 465-475.

"Determining Health and Wellness of an OCS Deployment", Microsoft Office Communications Server blog published Jul. 24, 2008, 5 Pages.

"How BizTalk Server Implements Host Throttling", Copyright Date 2010, 7 Pages.

Cobb, Michael; "Using Resource Allocation Management to Prevent DOS and Other Attacks", published Mar. 10, 2010, 3 Pages.

IBM—Tivoli—Workload—Automation accessed at: http://www-01.ibm.com/software/tivoli/products/workloadautomation/features.html; accessed on: Sep. 27, 2011, 2 pages.

Office Action, U.S. Appl. No. 12/958,134, filed Dec. 1, 2010, Office Action Notification Date: Jul. 11, 2013, 15 Pages.

Office Action, U.S. Appl. No. 12/958,134, filed Dec. 1, 2010, Office Action Notification Date: Nov. 13, 2013, 15 Pages.

Office Action, U.S. Appl. No. 12/958,134, filed Dec. 1, 2010, Office Action Notification Date: Jul. 9, 2014, 17 Pages.

Office Action, U.S. Appl. No. 12/958,134, filed Dec. 1, 2010, Office Action Notification Date: Mar. 20, 2014, 21 Pages.

Office Action, U.S. Appl. No. 13/350,827, filed Jan. 16, 2012, Office Action Notification Date: Sep. 12, 2014, 12 Pages.

Office Action, U.S. Appl. No. 13/315,382, filed Dec. 9, 2011, Office Action Notification Date: Apr. 9, 2014, 29 Pages.

Office Action, U.S. Appl. No. 13/315,382, filed Dec. 9, 2011, Office Action Notification Date: Sep. 11, 2014, 26 Pages.

Office Action, U.S. Appl. No. 13/350,827, filed Jan. 16, 2012, Office Action Notification Date: Mar. 16, 2015, 8 Pages.

Office Action, U.S. Appl. No. 13/315,382, filed Dec. 9, 2011, Office Action Notification Date: Apr. 30, 2015, 33 Pages.

* cited by examiner

THROTTLING POLICY 115

THROTTLE INTERACTIVE SCRIPTS: NO            501

THROTTLE HIGH PRIORITY USERS: NO            502

THROTTLE NON-INTERACTIVE SCRIPTS: YES       503

HEALTH RESOURCES:                           504

LOCAL CPU
        GREEN:     DELAY 0 SECONDS
        YELLOW:    DELAY .1 SECONDS
        RED:       DELAY 1 SECOND

DIRECTORY REPLICATION:
        GREEN:     DELAY 0 SECONDS
        YELLOW:    DELAY .1 SECONDS
        RED:       DELAY .2 SECONDS

INDEXING:
        GREEN:     DELAY 0 SECONDS
        YELLOW:    DELAY .25 SECONDS
        RED:       DELAY .50 SECONDS

MAILBOX DB 1:
        GREEN:     DELAY 0 SECONDS
        YELLOW:    DELAY .5 SECONDS
        RED:       DELAY 2 SECONDS

MAILBOX DB2:
        GREEN:     DELAY 0 SECONDS
        YELLOW:    DELAY 1 SECOND
        RED:       DELAY 5 SECONDS

FIG. 5

IDENTIFYING AND THROTTLING TASKS BASED ON TASK INTERACTIVITY

BACKGROUND

In many different scenarios, resources are used for performing work for entities that expect tasks to complete in relatively short order, e.g., a user may expect to interact with a particular computer program by waiting for results from the program before moving on to another task. Entities may also request tasks without any expectation of receiving interactive results. For example, the same user may run a different program knowing that the program will need to execute overnight before the user sees any results. In these examples, the resources may be computational resources associated with various computing devices that execute the computer programs.

Other types of resources also can be involved in interactive and non-interactive scenarios. For example, consider an office environment where some clients visit the office and expect immediate attention from employees. For example, an individual employee can perform an interactive task for the visiting client while they wait. Other clients may tend to communicate by mail and expect some delay before hearing from anyone in the office. Thus, the same employee may perform a non-interactive task by responding to the client by mail. In this scenario, the office employees themselves can be viewed as resources that perform both interactive and non-interactive tasks. In some cases, the employees may use computing devices to accomplish these tasks.

In computing contexts, one approach to improving interactivity of computing tasks is simply to upgrade computing hardware or add new hardware. Other approaches may use various scheduling schemes that attempt to ensure fairness between different tasks. For example, computational resources may maintain a queue of task requests and process them in the order they are received. Existing techniques, however, may tend to allocate resources in a way that is inefficient from the perspective of entities that wish to use the resources interactively.

SUMMARY

The above listed example is intended to provide a quick reference to aid the reader and is not intended to define the scope of the concepts described herein.

This document relates to processing of electronic data. One implementation is manifest as a system that can include logic and at least one processing device configured to execute the logic. The logic can be configured to receive a first task request to execute a first task that uses a resource when performed. The first task can have an associated first level of interactivity. The logic can also be configured to receive a second task request to execute a second task that also uses the resource when performed. The second task can have an associated second level of interactivity. The logic can also be configured to selectively throttle the first task and the second task based upon the first level of interactivity and the second level of interactivity.

Another implementation is manifest as a technique that can include receiving requests to execute one or more computer programs and obtaining health values reflecting health of one or more resources that are associated with the one or more computer programs. The technique can also include throttling individual computer programs based on the health values and levels of interactivity associated with the individual computer programs.

Another implementation is manifested as one or more computer-readable storage media comprising instructions which, when executed by one or more processing devices, cause the one or more processing devices to perform acts. The acts can include receiving a request to execute a script, and the script can be received in a source code format and include a reference to a binary command. The acts can also include determining that the script is not interactive and receiving, from the binary command, an identifier of a computing resource utilized by the binary command. The acts can also include checking a health monitor associated with the computing resource to determine a health status for the computing resource. The acts can also include comparing the health status to one or more criteria of a throttling policy and, in an instance when the throttling policy indicates the script should be delayed based on the health status, throttling the script.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIG. 5 illustrates an exemplary throttling policy in accordance with some implementations.

DETAILED DESCRIPTION

Overview

Figure 1:
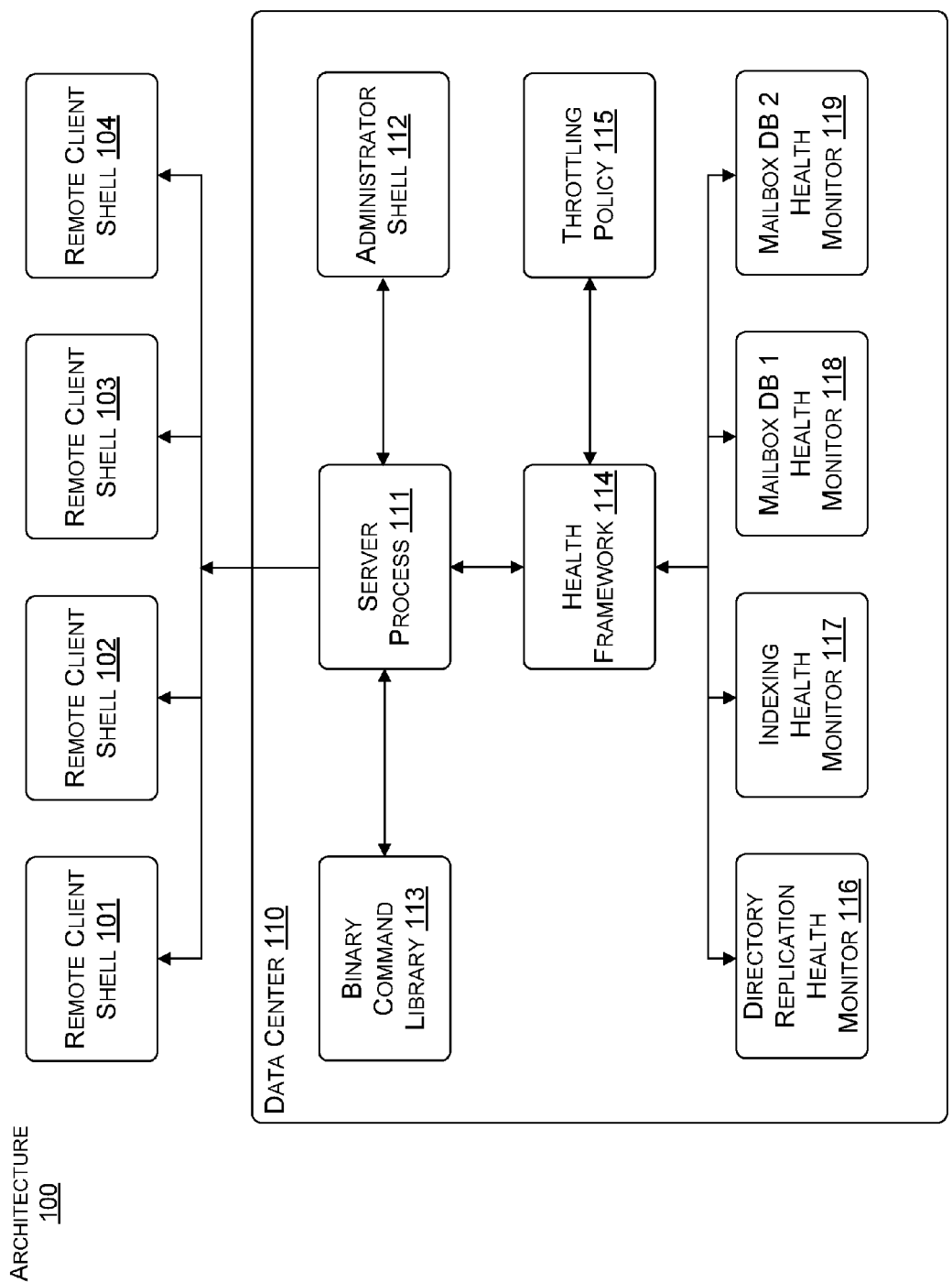
FIG. 1 shows an exemplary architecture in which the present concepts can be employed.

This discussion relates to electronic data processing, and more particularly to using electronic data processing to allocate resources among various tasks. For the purpose of this document, the term "resource" can include both computational resources and non-computational resources. Computational resources can include hardware resources such as computer processors/on-chip caches, memory, storage, and network capacity as well as software resources such as threads, processes, licenses, etc. Non-computational resources can be real-world resources that can be modeled using computational resources. For example, electrical power can be characterized as a non-computational resource, as can traffic capacity of a road, availability of an employee for work, account balances, income, etc.

As used herein, the term "task" denotes a piece of work produced for an entity (such as a user) to produce a result. A task can include one or more work units, where the work units are individual portions of the task that can collectively complete the task. The following discussion illustrates certain concepts with respect to a particular implementation where the tasks are scripts that are executed by various end users in a computing environment. Each script can invoke various commands that are executed when they are invoked, and thus the commands are examples of work units.

The computing environment can include various computing resources that have associated health statuses, and the health statuses can tend to fluctuate over time depending on demand for the resources. Generally, the disclosed implementations can tend to throttle non-interactive tasks with the goal of achieving more responsiveness for interactive tasks. In some implementations, a given task is throttled by delaying individual work units that are part of performing the task. To determine whether and/or how much a task should be throttled, characteristics of the task can be compared to throttling criteria in the throttling policy. Task characteristics can include the identity of the entity requesting the task, whether the task is interactive, resources used by the task, etc.

In the case of a script that invokes one or more commands, the script can be throttled by delaying individual commands of the script. As used herein, the term "script" refers to a computer program that is provided for execution in a source code format and then interactively compiled or interpreted when a request to execute the script is received. In contrast, the term "binary" refers to a program that is provided in a binary form (e.g., object file, linked executable, etc.). Some scripts may invoke commands that are available in a binary form. For example, a "cmdlet" is a type of command that can be developed in source code and provided in a binary form that can be invoked by a script. Thus, a script may itself be interpreted or compiled at runtime, but the script can have references therein to various precompiled binary commands that are invoked at runtime by the script.

Example Architecture

FIG. 1 illustrates an architecture 100 in which remote client shells 101, 102, 103, and 104 communicate with a data center 110. Each remote client shell can interface with a server process 111 to execute various scripts for users of the client shells. The server process can also execute various scripts for a data center administrator that interfaces with the server process via an administrator shell 112. For example, the data center administrator can be responsible for administering resources at the data center that perform processing for various remote tenants. Each remote tenant can perform tenant-specific administrative duties via the remote client shells. Collectively, the remote client shells 101-104 and the administrator shell 112 are referred to herein as "shells."

In one specific example, the data center 110 provides email functionality for multiple different tenants, e.g., each tenant can be a different business that arranges for the data center to handle their email processing. Each remote client shell 101-104 can correspond to a different tenant administrator that is responsible for administering data center resources for their respective tenant. As discussed more below, the data center administrator may have a great deal of control over how various resources at the data center are allocated to the various tenants. In contrast, tenant administrators may only control respective functionality associated with their particular tenant, and may have little or no control over resource allocation within the data center.

The server process 111 can communicate with the various remote client shells 101-104 via HTTP (Hypertext Transfer Protocol) over a network connection. The administrator shell 112 can execute directly on an individual server machine that executes the server process, but can also be launched from another machine either within the data center or from outside the data center, provided there is network connectivity. Each of the shells can send scripts to the server process, and the scripts can include references to various binary commands in a binary command library 113. For example, the binary commands can be "cmdlets" such as used within a Windows Powershell® process. The server process can compile the received scripts and, during parsing, identify the individual references to the binary commands. Note that multiple scripts can execute within the server process concurrently, e.g., scripts received from different shells associated with different users and/or multiple scripts received from a single shell.

As a given script executes within the server process 111, the individual binary commands within the script can periodically check with a health framework 114 to determine the health status of various resources that they use. For example, each invocation of a particular binary command by the script can cause that binary command to check the health status of one or more resources. Depending on the health status, the binary commands can be throttled back to consume resources at a slower rate until resource health improves.

In some implementations, whether throttling is performed is a function of whether the script is interactive. Thus, an instance of a particular binary command that executes within a non-interactive script can be throttled to consume fewer resources, while another instance of the same binary command executing within an interactive script can be allowed to execute freely. Throttling of certain scripts/commands can help preserve a quality user experience for various end users by reducing latency of interactive scripts. Throttling can also prevent more severe problems such as outright denial of service or crashing of applications, services, or hardware within the data center 110.

In some implementations, the health framework 114 can provide feedback to the individual binary commands that determines whether the binary commands self-throttle. For example, the health framework can use a throttling policy 115 to determine whether to instruct particular binary commands to self-throttle. The health framework can base the determination on health status received from various health monitors. In FIG. 1, the health monitors include a directory replication health monitor 116, an indexing health monitor 117, a mailbox database (DB) 1 health monitor 118, and a mail box DB 2 health monitor 119.

Example System

Figure 2:
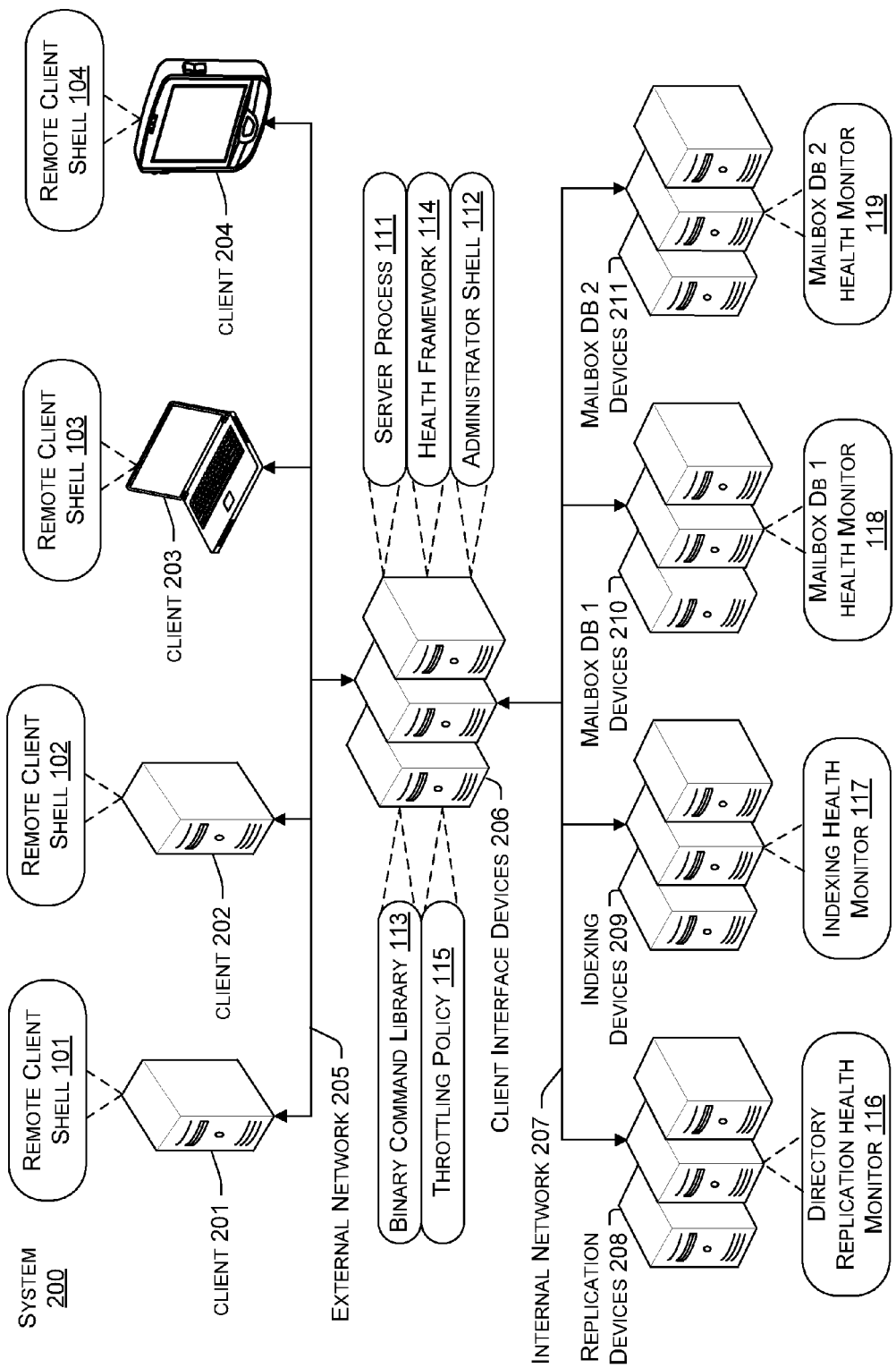
FIGS. 2 and 8 show example systems that can be configured to accomplish certain concepts in accordance with some implementations.

FIG. 2 illustrates an exemplary system 200 that can be used to implement architecture 100. System 200 includes multiple client devices 201, 202, 203, and 204 that can communicate via an external network 205 (e.g., the Internet) with one or more client interface devices 206. For example, the client interface devices can be one or more server devices at data center 110, where one or more of the client interface devices execute server process 111. Server process 111 can in turn execute various individual binary commands from binary command library 113 when they are invoked by various scripts. Health framework 114 can also execute on one or more of the client interface devices and throttling policy 115 can be stored on one or more of the client interface devices. Administrator shell 112 can also execute on one or more of the client interface devices, although as previously noted administrator shell 112 can also be executed on a device that is remote from the data center or a different device in the data center. Each of the client devices 201-204 can execute a corresponding remote client shell 101-104.

As mentioned above, individual resources can have associated health monitors 116-119 that provide feedback regarding the health of the associated resources. These health monitors can be implemented on corresponding devices that provide the associated resources. The health monitors can communicate with the health framework over an internal network 207.

For example, directory replication health monitor 116 can execute on one or more replication devices 208, and can report health status for the replication devices to health framework 114 as the replication devices perform replication functionality as discussed herein. Likewise, indexing health monitor 117 can execute on one or more indexing devices 209 and report health status for the indexing devices as they perform indexing functionality as discussed herein. Mailbox DB 1 health monitor 118 can perform similar functionality on one or more mailbox DB 1 devices 210, with mailbox DB 2 health monitor 119 in an analogous role on mailbox DB 2 devices 211.

Note also that system 200 is but one example of a system that can be used to implement architecture 100. For example, the individual health monitors do not necessarily execute on the associated devices. Instead, for example, each health monitor can execute on an individual client interface device with the health framework 114. In such implementations, the individual resource devices 208-211 can send messages over internal network 207 to the health monitors. The messages can be used by the health monitors to determine the health status for their associated resources.

More generally, any of the components shown in FIG. 2 can be implemented on computing devices in a different manner than that shown herein. For example, the server process 111 and health framework 114 can execute on one or more devices connected to internal network 207 that do not necessarily communicate directly with the client devices 201-204. In such implementations, the client interface devices 206 may be largely responsible for routing traffic to and from various back-end devices in the data center to the client devices. For example, some other processes may bypass logic on the client interface devices and execute directly on devices at "deeper" backend servers. In such implementations, an instance of the health framework can be provided on the backend servers to throttle resource usage by the other processes. Generally, however, it can be useful to provide the health framework on client-facing servers so that resource throttling is performed early in the processing pipeline of system 200.

Health Monitors

Generally, each health monitor 116-119 can be responsible for monitoring the health of particular resources. As mentioned above, health monitors may monitor one or more computing devices that are used to implement the resource, e.g., devices 208, 209, 210, and 211. Note, however, that some computing devices may be used for multiple different resources, e.g., a given computing device can perform both indexing and mailbox database functionality. Other devices may be assigned solely to a particular resource. For example, indexing may be performed by a group of five server devices and mailbox DB 1 can be implemented by a group of three server devices, one of which is also used for indexing. In this example, the indexing health monitor 117 and mailbox DB 1 health monitor 118 collectively monitor a total of 7 devices.

Note that the various health monitors 116-119 can be considered "logical" health monitors in the sense that they monitor resources from a logical perspective. The underlying hardware used to implement a particular resource can change, e.g., a server can be added for indexing purposes and the indexing health monitor 117 still monitors the health of indexing resources as a whole. Accordingly, the throttling mechanisms discussed herein can throttle scripts based on status of underlying logical resources irrespective of the particular hardware implementation. This allows the resource usage of the individual binary commands to be expressed in terms of the logical resources that they utilize. In other words, a given binary command does not need to specify that it uses a particular indexing server. Rather, the binary command can merely specify that it uses indexing resources. Accordingly, the underlying hardware mappings can change without making corresponding changes to update the binary commands. In a sense, each individual health monitor serves as a logical abstraction that characterizes health of a given logical resource while abstracting details of the underlying hardware implementation.

The particular roles of the different health monitors discussed herein relate to one specific implementation where the data center 110 provides email functionality to remote tenants. In this example, directory replication health monitor 116 can be responsible for monitoring the health of a directory replication service that replicates one or more "active directories." Generally, an active directory is a way of storing data such as user contact information, application configurations, device configurations, security permissions, etc. The data can be represented as objects within a hierarchical directory structure stored at a particular domain. The directories can be replicated across multiple devices (e.g., multiple domain controllers) to maintain up-to-date object and directory information across multiple associated domains.

Some scripts or binary commands can impose a relatively heavy load on directory replication resources, and at other times the directory replication load can be quite light. Generally, the directory replication health monitor 116 provides the health framework 114 with an indication of how relatively healthy the directory replication resources are, e.g., the health of replication devices 208 and associated network connections. The health framework can in turn cause the individual binary commands that depend on the replication devices to self-throttle during periods when the replication devices are relatively unhealthy. As discussed more below, some implementations may throttle instances of individual binary commands that are invoked by a non-interactive script while other instances of the same binary commands in interactive scripts may proceed without throttling.

The indexing health monitor 117 can be responsible for monitoring the health of indexing resources within the data center. For example, the indexing devices 209 may be tasked with maintaining up-to-date indexes to provide quick searching functionality for email accounts. As mentioned above with respect to the directory replication health monitor, certain scripts or binary commands can cause a relatively heavy load on the indexing devices, whereas at other times the indexing devices are less taxed. In this case, the health framework 114 can cause individual binary commands that depend on the indexing devices to self-throttle during periods when the indexing devices are relatively unhealthy. Whether an instance of a binary command is throttled and/or the extent of the throttling can depend to some extent on whether the instance was invoked by an interactive script or a non-interactive script.

Mailbox DB 1 health monitor 118 and mailbox DB 2 health monitor 119 perform similar functionality as discussed above with respect to health monitors 116 and 117. The mailbox DB 1 health monitor may monitor health status for the mailbox devices 210 associated with a first email database, and the mailbox DB 2 health monitor may perform a similar role for a different email database. In instances when DB 1 is relatively unhealthy and DB 2 is relatively healthy, an instance of a binary command that uses DB 1 resources may be throttled while another instance of the same binary command that uses DB 2 resources may proceed unimpeded.

Monitoring Metrics

The individual health monitors can use different metrics to characterize the health of a given resource, and different techniques can also be used to propagate the health status to the health framework 114. The following discussion introduces some exemplary techniques that can be used to characterize the health of a given resource.

For example, consider a mailbox database implemented on 5 different backend servers functioning as mailbox DB 1 devices 210. One way to characterize the health of the mailbox database is based on latency of the database. For example, under relatively light loads, mailbox database DB 1 may, on average, respond to requests to retrieve emails in less than 1 second. The mailbox database can measure this latency from when the mailbox database receives the request to when the mailbox database satisfies the request, e.g., the time when a request is received over the network until a response is transmitted over the network. As average latency increases, this can indicate the mailbox database is becoming unhealthy.

In some implementations, a green/yellow/red scheme can be used to characterize resource health. In the aforementioned example, the mailbox DB 1 health monitor 118 may report to the health framework 114 a health of "green" whenever average latency is one second or less, a health of "yellow" whenever average latency is between 1 second and two seconds, and a health of "red" whenever average latency exceeds 2 seconds. For example, average latency can be measured over a moving window, e.g., a moving average over the last minute of processing.

Other implementations may use a number to characterize health, e.g., the mailbox DB 1 health monitor 118 can report a health of 100 whenever latency is less than 0.5 seconds and a health of 0 whenever latency exceeds 2.5 seconds. Intermediate health values can be determined by interpolating, e.g., a linear function could report a health of 75 for 1 second of latency, health of 50 for 1.5 seconds of latency, health of 25 for 2 seconds of latency, etc. Nonlinear functions can also be employed for these purposes. Furthermore, other representations such as floating point values, percentages, etc. can also be used to represent health status. Some implementations may also use an inverse approach where relatively higher numbers correspond to relatively worse health status, e.g., a value of 100 indicates high latency and a value of 0 indicates low latency.

Latency is but one example of a metric that can be used to characterize health of a given resource. For example, memory availability, CPU utilization, network traffic congestion, or other hardware concepts can be other metrics used to represent resource health. For example, the mailbox DB 1 health monitor 118 can report a health value that represents the average CPU utilization or average memory utilization across the mailbox DB 1 devices 210. These metrics can be reported to the health framework 114 separately or in a single combined value. For example, the mailbox DB 1 health monitor can determine multiple different health metrics including mailbox latency, average mailbox DB 1 device CPU utilization, average mailbox DB 1 device memory utilization, and average network congestion from the perspective of mailbox DB 1 devices 210.

In some implementations, the mailbox DB 1 health monitor 118 can apply a function to the multiple health metrics to obtain a single health score that is reported to the health framework. One example function could take a minimum of the four health metrics and report a health value based on the worst-case metric only. For example, if latency, CPU utilization, and network congestion are all reasonably healthy but the mailbox DB 1 devices only have 2% average memory availability, the mailbox DB 1 health monitor can report "red" indicating bad health. In other implementations, the mailbox DB 1 health monitor can use a function of multiple different health metrics to compute a single health score, e.g., a weighted average.

Some implementations may also determine the health scores at the health framework 114. In these implementations, the health monitors may be responsible for collecting metrics such as those mentioned above and providing the metrics to the health framework. The health framework can then compute one or more health scores for individual resources instead of performing the computation at the health monitor.

Health monitoring can be accomplished using both active and passive mechanisms. For some resources, individual health monitors can actively poll associated hardware resources that are used by that resource monitor. For example, the directory replication health monitor 116 may actively monitor health of replication devices 208 as these devices are performing directory replication. Thus, the directory replication health monitor can periodically (e.g., every 5 seconds) send a message to each of the replication devices 208. In response, each of the replication devices 208 can send messages to the directory replication health monitor with one or more metrics reflecting health of these devices, such as the aforementioned latency, CPU/memory utilization, and network congestion metrics.

In some implementations, the mailbox DB 1 and DB 2 health monitors 118 and 119 may implement a passive technique for obtaining health metrics from devices that provide these resources. For example, each remote procedure call (RPC) to any one of the mailbox DB 1 devices 210 can cause that device to respond to the RPC. The response can include "piggybacked" health metrics such as latency of the last 1024 RPC calls across the mailbox DB 1 device that is responding to the RPC. Other piggybacked health information can include RPC per second rate, RAM utilization, etc. As mentioned above, the mailbox DB 1 health monitor 118 can use this information to determine a health score for mailbox DB 1 as a whole that is then reported to the health framework. For example, the mailbox DB 1 health monitor can average the RPC per second rates, RAM utilization, etc. across multiple mailbox devices to obtain the health score.

Note also that CPU and/or memory utilization associated with performing the server process 111 can also be used for throttling purposes. Some implementations provide a local health monitor on one or more of the client interface devices 206 that monitors CPU and/or memory usage on these devices. For some scripts, the local processing within the server process on the client interface devices can be relatively intensive. This local health status can be independent of the health statuses of the various other resources (e.g., devices 208-211) used by the scripts.

Example Binary Command Library

Figure 3:
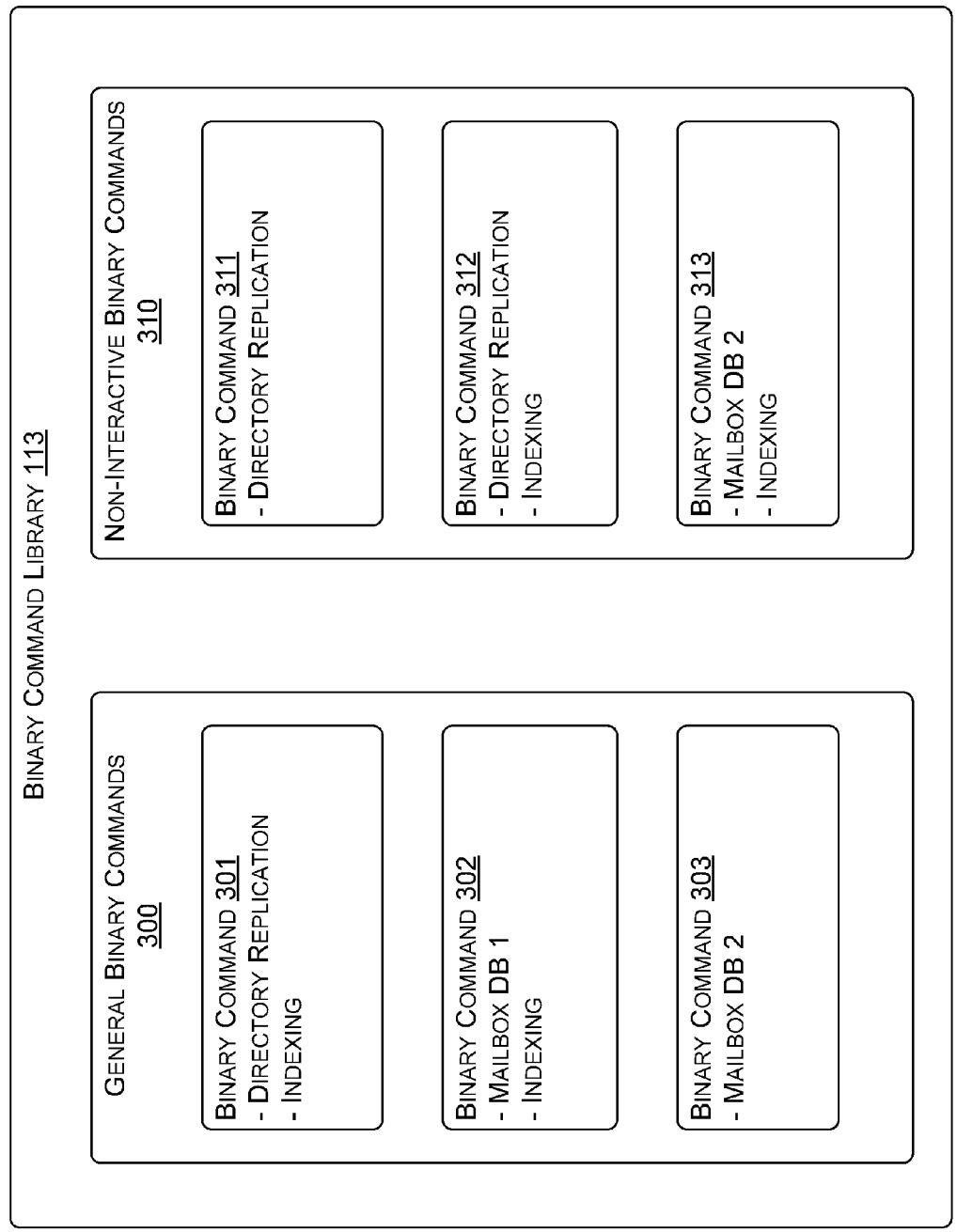
FIG. 3 shows an exemplary command library in accordance with some implementations.

FIG. 3 illustrates the binary command library 113 in more detail. As mentioned above, scripts can invoke different binary commands that are available in the binary command library. Depending on how a given script uses the different binary commands, the script can be considered interactive or non-interactive.

As shown in FIG. 3, some implementations include a group of general binary commands 300 and a group of non-interactive binary commands 310. The general binary commands include binary commands 301, 302, and 303, whereas the non-interactive binary commands include binary commands 311, 312, and 313. Generally speaking, any script that invokes at least one of the non-interactive binary commands can be characterized as a non-interactive script. Binary commands that tend to take a long time to execute and/or use a great deal of resources may be good candidates for classifying as non-interactive. Scripts that do not use any of the non-interactive binary commands can still be classified as non-interactive depending upon other characteristics of the script, as discussed more below.

One way to track whether a given binary command is possibly interactive is to maintain a whitelist that identifies each interactive binary command. Any binary command that is not on the whitelist can be considered non-interactive, and thus any script invoking such a binary command can also be treated as non-interactive. Conversely, a blacklist can be used where any binary command on the blacklist is considered non-interactive and other binary commands are considered interactive. In this case, any script invoking a binary command on the blacklist can be considered non-interactive.

Whether a particular binary command is classified as non-interactive is, to some extent, a design decision. For example, some binary commands may tend to be "destructive," e.g., binary commands that do deletions. For example, a particular binary command may delete an entire user mailbox and this may consume a great deal of resources on a corresponding mailbox database. Even if a user is actually sitting at a terminal and invoking this binary command from a command line interface, it may be preferable to treat the command as non-interactive.

Individual binary commands can be configured to report the particular resources that they use to the health framework 114. As shown in FIG. 3, binary command 301 uses directory replication and indexing resources, binary command 302 uses mailbox DB 1 and indexing resources, and so on. In some implementations, binary commands can be configured statically, at compile time, to identify which resources they use. Other times, a binary command may have runtime code that determines when the command is invoked which resources the command will use. For example, a given binary command may use resources from either mailbox database depending on one or more arguments passed to that command by the script. Depending on the arguments that are received by the command, the command may report that it uses mailbox DB 1, mailbox DB 2, or both.

Script Interactivity

As discussed above, one technique to determine whether a given script is interactive is based on whether the script invokes any non-interactive binary commands. Another way to categorize a given script as interactive or non-interactive is for the author of the script to manually label the script itself. For example, a given script may make a call or pass a value to the health framework that identifies whether the script is interactive or non-interactive. From the perspective of the data center, this can raise some concerns that some tenants will write their scripts to be treated interactively even when this is not the case. For example, a given tenant administrator may decide to write a script that touches 300,000 different mailboxes and yet still request to be treated interactively. For this reason, some implementations may define a subset of tenant accounts as trusted accounts. Trusted accounts may be permitted to characterize their own scripts as interactive or non-interactive, whereas regular accounts may not have this degree of control.

Often, trusted accounts are accounts that agree beforehand to limit the amount of work that they request from the data center to a predetermined amount of work. For example, a trusted account may be negotiated with a large customer that agrees to restrict their usage of various resources during certain hours or to a fixed amount within a predetermined period such as a day, week, month, etc. Trusted accounts can also be determined based on tenant behavior, e.g., tenants may be able to earn trusted status by consistently using resources in a responsible manner.

Further implementations may characterize a given script as interactive or non-interactive using static analysis or dynamic analysis of the script. For example, static analysis can include using various heuristics to analyze the source code of a script to determine whether the script is likely to be interactive. This analysis can, in some cases, be performed before the script is even executed by the data center. One heuristic might look at the size of a for-each loop in a given script and classify any script with a loop counter greater than a certain value (e.g., 100) as a non-interactive script.

Further implementations may actually look at what binary commands are invoked within the loop iterations. For example, each binary command can be assigned a relative weight that reflects runtime characteristics of the binary command, e.g., whether the binary command tends to take a long time to run, whether the binary command uses a great deal of computing resources, etc. The weights of each binary command in the loop can be summed and the sum can be multiplied by the loop counter to get a value that characterizes the weight of the loop. For scripts with multiple loops, the weight of each loop can be added along with weights for binary commands that are executed individually to obtain a final weight for the script. Scripts exceeding a given weight can be classified as non-interactive, and otherwise can be treated as interactive scripts. Other implementations may characterize a script as interactive or non-interactive based on a total number of operations included therein.

Note that some forms of static analysis can be performed on the source code of the script in question, but at the same time utilize information derived from executing other scripts. For example, historical data can be obtained over time as various scripts execute, and characteristics of these scripts can be stored as training data along with an indication of whether each script was interactive or not. The interactivity of the scripts used for the training data can be obtained by manually tagging the scripts as mentioned above with respect to trusted accounts, by tracking user activity such as keyboard or other inputs (e.g, touchscreen gestures) during the lifetime of a given script, or using other techniques.

This training data can be applied using techniques such as artificial intelligence, machine learning, and/or probabilistic methods to characterize a given script as interactive or non-interactive. In a sense, this can be viewed as a form of predictive analysis because the script in question does not need to be executed to perform the analysis. Rather, execution characteristics of previously-executed scripts are used to inform the decision whether to treat a new script as interactive or not.

Generally, scripts can have different characteristics that suggest interactivity or non-interactivity. For example, certain patterns of usage of binary commands may suggest that a given script is likely to be a non-interactive script. As a specific example, binary command 2 may tend to appear in both interactive and interactive scripts, but to only appear with binary command 3 when in a non-interactive script. Thus, scripts that include both binary command 2 and binary command 3 can be characterized as non-interactive, whereas scripts with binary command 2 that do not include binary command 3 (or vice versa) can be characterized as interactive. This can also be true for certain sequences of binary command invocations, e.g., binary command 2 immediately preceded by binary command 3 may be indicative of non-interactive usage whereas this may not be the case if other binary commands are invoked in between commands 2 and 3.

Further implementations may characterize the interactivity of a given script dynamically, e.g., by analyzing runtime behavior in association with the script. In one implementation, different pathways are provided for executing interactive vs. non-interactive scripts. For example, there may be a first pathway that receives keyboard input from the various remote client shells and a second pathway that receives file input from the remote client shells. Suitable code may also be provided in the client shell that communicates with the individual pathways based on which form of input is used to provide a given script.

Since keyboard input is more likely to be interactive work, any scripts received by the first pathway can be characterized as interactive. Likewise, since scripts loaded from files are more likely to be non-interactive work, scripts received by the second pathway can be characterized as non-interactive work. Note that runtime decisions can be made to override this initial characterization, e.g., if a user enters keyboard inputs to delete 100,000 user accounts then this can be initially treated as interactive and, during execution time, recognized as non-interactive. Likewise, scripts provided by file input that are relatively lightweight can be recharacterized as interactive.

More generally, scripts can be evaluated at runtime and recharacterized at any time. For example, an interactivity score for a given script can be initialized to a given value, perhaps 100 for keyboard input scripts and 50 for file inputs. If this value falls below a given threshold, e.g., 25, the script can be treated as non-interactive and otherwise treated as interactive. Various factors can be used to reduce the interactivity score at runtime such as resource usage, repeated invocation of particular binary commands, a relative lack of keyboard, mouse, or other inputs, etc.

Also note that scripts can be classified for relative interactivity at more refined levels of granularity than a binary interactive/non-interactive classification scheme. For example, scripts can be classified on a scale of 1-10 with 10 being the most (or least) interactive. The particular interactivity value can be a function of the aforementioned static or dynamic analysis. In the case of static analysis, relative weights of individual script statements and/or individual binaries referenced therein can be considered, as well as for-loop counters or other statements in the source code of the script. Learning and/or probabilistic techniques can also be used to assign interactivity values to individual scripts as mentioned above, using previously-executed scripts as training data. Dynamic analysis of resource utilization can also be used to obtain interactivity values at more refined levels, e.g., a script that uses 50% of a given resource when executing may be assigned an interactivity value 5× greater than another script that uses 10% of the same resource.

Example Throttling Method

Figure 4:
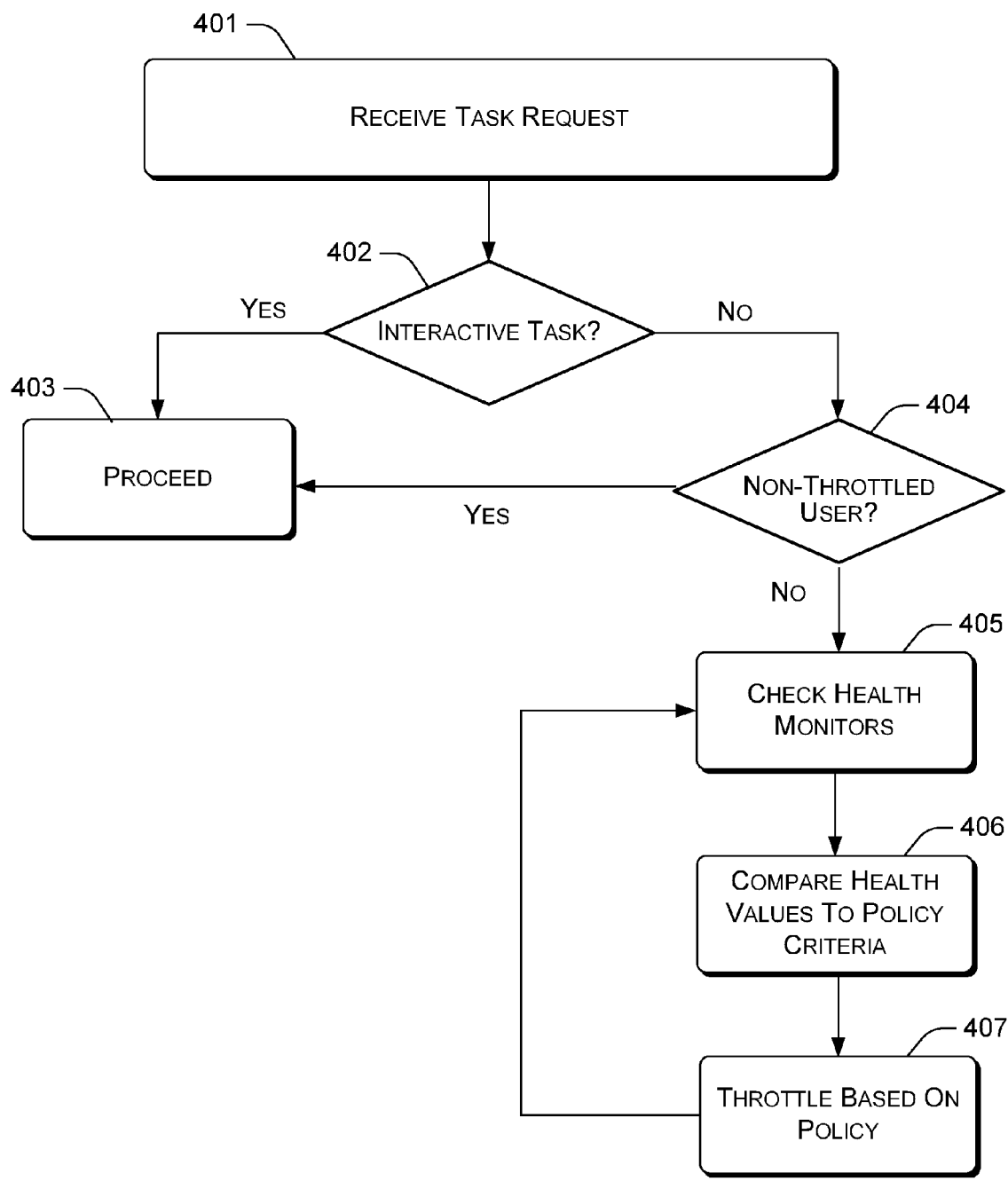
FIG. 4 is a flowchart for accomplishing certain concepts in accordance with some implementations.

FIG. 4 shows an example throttling method 400 that can be applied to throttle tasks by comparing characteristics of the task to various throttling criteria. Method 400 is discussed initially with examples where the task is a script and the work units are individual binary commands, and additional examples of tasks and work units are introduced later in this document. In the following example, throttling method 400 is be performed by the health framework 114 for script. Thus, at any time, multiple instances of throttling method 400 can be processing different binary commands invoked by different scripts.

At block 401, a task request is received, where the task relies on one or more resources for completion. The task can be an individual script that references one or more binary commands. Each binary command may identify specific resources that it intends to use, e.g., a particular mailbox database, a directory replication service, etc.

At decision block 402, a decision is made based on whether the task is interactive. For example, the task may be labeled as interactive or non-interactive, and thus interactivity is a characteristic of the task. In the case of a script, the label may be explicitly included in the source code of the script or, alternatively, can be obtained by inspecting the script source code or runtime behavior of the script. Next, if the task is labeled as interactive, the task may be allowed to proceed irrespective of resource health at block 403.

Otherwise, the method continues to decision block 404. At decision block 404, a decision is made based on an identity of the user requesting the task. Here, the requesting user is another characteristic of the task. If the user is a non-throttled user (e.g., high priority user), the task may be allowed to proceed at block 403 irrespective of resource health. For example, a determination can be made as to whether the user executing a particular script is a user that is not throttled according to some policy, e.g., a throttling policy. This can be the case for users such as data center administrators that can have authority to execute whatever scripts they wish irrespective of resource health.

Otherwise, the method proceeds to block 405 where one or more health monitors for resources used by the work units of the task can be checked to obtain health values reflecting health of the resources. In the example architecture 100, the health framework 114 can communicate with the health monitors for any resources identified by an individual binary command of a script, e.g., resources the binary command indicates it will use if executed.

Next, the method proceeds to block 406 where the health values are compared to one or more criteria of a throttling policy. Generally, the policy can indicate that throttling should be performed at certain levels of health for resources used by the work units of the task. Thus, the throttling criteria can include the health of the resources used by the work units, and the resources used by the task can be a characteristic of the task used for the throttling determination. In the scripting examples presented herein, the throttling policy may specify that if mailbox database 1 health is below 70, the script is throttled for 100 milliseconds, if health is below 60, the script is throttled for 200 milliseconds, etc.

Next, the method proceeds to block 407, where the task and/or work units are throttled in accordance with the policy. Some implementations of the scripting example may put the binary command to sleep for the duration of time set forth in the policy, e.g., the health framework may send the binary command an instruction to sleep. In some cases, each binary command may execute within its own thread and that thread can be put to sleep for the duration specified in the throttling policy. As another example, the health framework 114 can intercept requests from the binary requests intended for the resources and delay forwarding the requests for the duration of time set forth in the policy.

Next, method 400 can iterate over each work unit of a given task using blocks 405-407. In the scripting example, each binary command executed by the script causes blocks 405-407 to be performed until the script has completed. Generally, multiple iterations of blocks 405-407 for a single task can obtain different health values for the resources and thus different levels of throttling can be applied to the task as the health values change.

Consider method 400 as presented above where the task is resource-intensive script that invokes an individual binary command one million times. For example, the binary command may be a "Get-Mailbox" command that retrieves attributes and objects for a given mailbox from mailbox DB 1. The first time the binary command is invoked in method 400, it is likely that no throttling will be employed unless there are other resource-intensive operations concurrently accessing mailbox DB 1. Over time, however, the mailbox DB 1 health monitor 118 will likely begin to report a decrease in health because of the relatively intense usage of this resource by the script. At some point, the method may begin throttling the script by delaying individual instances of the Get-Mailbox command. If health continues to degrade, the throttling can get more aggressive, e.g., increasingly longer delays can be inserted as the health gets worse. The delays, in turn, give the individual devices that implement mailbox DB 1 time to "catch up" to the demands imposed by the script. This can sometimes cause the reported health status to improve and therefore allow the script to proceed with less delay.

To some extent, the logic discussed above with respect to the health framework can alternatively be implemented directly by the individual binary commands. For example, the health framework could be eliminated entirely and logic included in each binary command to perform all of method 400. That said, such an implementation could be relatively heavyweight in the sense that the logic would then be duplicated across each binary command instead of resident within a single framework shared by multiple binary commands.

Some binary commands may also implement some but not all of method 400. For example, a given binary command can determine whether the script is interactive and, if so, proceed without communicating with the health framework. Likewise, a given binary command can determine whether the user is a priority user and, if so, proceed without communicating with the health framework. In some implementations the health framework or individual binary command may obtain the identity of the user when the HTTP traffic is received from the shell, e.g., before the script even begins executing.

The health framework 114 can also provide one or more application programming interfaces that can be called by the individual binary commands. For example, a binary command may make a call to the health framework in a form such as: ResourceHealth.ThrottleMe (Interactive, ResourceA, ResourceB, ScriptID). Here, the Interactive parameter indicates whether the script is interactive, the ResourceA and ResourceB parameters identify resources used by the calling command, and ScriptID identifies the particular script that has invoked the binary command. In response, the health framework can provide the binary command with a suggestion for whether to sleep and, if so, for how long. The binary command can then sleep for the amount of time suggested by the health framework.

In further implementations, a given command can choose to just terminate instead of sleeping if the delay instructed by the health framework exceeds a certain threshold. For example, a given script or command may have an associated maximum Service Level Agreement (SLA) time in which the script or command is expected to complete. In such implementations, it may be preferable to fail a given script or command completely instead of continuing processing past the SLA time limit, because this can free resources and make it more likely that other scripts/commands can meet their SLA times. Further implementations may provide a flag or other parameter passed in via the script that controls whether scripts/commands continue processing past their SLA times or stop processing once the SLA time is exceeded.

Other implementations may use different techniques such as thread queuing to perform the throttling. For example, the health framework may manage a pool of available threads and the health framework may move a given binary command off of an active thread for the duration specified by the throttling policy.

Also note that some implementations may route traffic from individual binary commands through the health framework 114 and the health framework 114 can send the traffic to individual resources on behalf of the binary commands. In this case, the health framework can throttle a given script by inserting delays into the traffic before forwarding the traffic on to the requested resources. In other implementations, the individual binary commands communicate directly with the resources they utilize. In these implementations, the delays can be performed by directly having the binary commands go to sleep for specified periods.

Throttling Policy

Generally, method 400 as discussed above can be viewed as performing throttling of a task by applying criteria of a throttling policy to one or more characteristics of the task. The criteria discussed above include an identifier of the user, interactivity of the task, and health of various resources used by the task. As mentioned above, the throttling policy can be used to configure whether certain delays are inserted into a given task, as well as the duration of those delays. However, note that the criteria discussed above are merely exemplary, and other criteria can also be applied, as discussed more below.

FIG. 5 illustrates an exemplary throttling policy 115 consistent with the disclosed implementations. The throttling policy generally can include flags indicating whether to perform certain logic associated with method 400. In FIG. 4, a throttle interactive scripts flag 501 is set to no, indicating that interactive scripts should not be throttled. If this flag is set to yes, however, interactive scripts can be throttled as well as non-interactive scripts. Note that setting the throttle interactive scripts flag 501 to yes implies that method 400 moves from decision block 402 to decision block 404 instead of proceeding at block 403 even for interactive scripts. Thus, method 400 can ultimately continue to block 407 and throttle interactive scripts as well.

Similarly, the throttling policy 115 can include a throttle high priority users flag 502 that is used to control whether high priority users are throttled. If this flag is set to yes, scripts can be throttled for high priority users as well as low priority users. In FIG. 5, the throttle interactive flag is set to no, indicating that scripts executed by high priority users should not be throttled. If this flag is set to yes, however, high priority users may also see some throttling of their scripts. Note that setting the throttle high priority users flag 502 to yes implies that method 400 moves from decision block 404 to block 405 instead of proceeding at block 403 even for high priority users. Thus, method 400 can ultimately continue to block 407 and throttle high priority user scripts as well.

The throttling policy 115 can also include a throttle non-interactive scripts flag 503 that functions similarly to throttle interactive scripts flag 501. In some implementations, setting all 3 flags to "no" implies that no throttling at all is performed within the data center 110. However, other implementations may perform script throttling even when all the flags are set to no, e.g., throttling for reasons unrelated to resource health.

Throttling policy 115 can also include a health resources section 504 where individual resource types can be configured with different throttling delays based on resource health values. In FIG. 5, local CPU is one of the resources, where a value of green for local CPU implies no throttling, a value of yellow implies a 0.1 second delay, and a value of red implies a 1 second delay. In this example, the local CPU portion of the throttling policy specifies the associated delays for any computing devices that are actually executing the script and executable binaries themselves, e.g., client interface devices 206. Thus, if the local CPU value is yellow, the health framework will instruct the individual binary commands within the script to delay 0.1 seconds before continuing, and delay 1 second if the value is red.

Health resources section 504 also includes configurations for directory replication, indexing, mailbox DB 1, and mailbox DB 2. Here, the health framework will perform processing as follows. If the directory replication health monitor 116 reports a status of green, no delays, yellow, 0.1 seconds, and red, 0.2 seconds. The health framework will perform similar processing in response to health status from the mailbox DB 1 and DB 2 health monitors 118 and 119, respectively. In this example, the DB 2 throttling policy is more aggressive in the sense that the delays are much larger for this email database.

Generally, the throttling policy can include any criteria that could serve as a basis for throttling a particular script. The criteria discussed herein (e.g., health resources, user priority, interactivity, etc.) are merely exemplary and throttling policies can use many different criteria to determine both whether to insert delays into scripts and also how long the delays should be. For example, another criterion could be a user history, e.g., for a tenant administrator. The policy can be configured so that tenant administrators get a certain amount of time for running non-interactive scripts as if they were interactive, e.g., without throttling at all or with less throttling. In one specific implementation, the policy specifies a number of minutes per hour that non-interactive work for an individual tenant administrator is performed interactively. Once this time limit is exceeded, the work is classified as non-interactive work and subject to the more aggressive throttling policy.

Another example criterion could be a service plan. Different tenants may pay for different levels of service, e.g., gold, silver, and bronze levels of service. Gold members may always have their scripts treated as interactive work irrespective of resource health. Silver members may have their work treated as non-interactive work during off-hours (e.g., 6 PM until 6 AM) and for 30 minutes per hour. Bronze members may have their non-interactive work always treated as non-interactive. In a similar manner, each individual tenant can have an associated service plan with different associated throttling policy rules.

Another example criterion can be a work priority. In this context, work priority may refer to how relatively critical a given script is, e.g., tenants may have the ability to designate particular scripts as more important than others. For example, a script to encrypt passwords for 100 k email accounts may be non-interactive work, but it might also be very important to get this work done quickly. Tenant administrators may designate such work as high priority and other work as having lower priority. In this sense, the priority mechanism can work together with the interactive mechanism, e.g., a given script can be a high-priority interactive script, a high-priority non-interactive script, a low priority interactive script, or a low-priority non-interactive script. As with the other criteria discussed herein, notions of priority can be expressed at different levels of granularity than the explicit examples provided herein, e.g., priority can be a number from 1 to 100, etc.

As previously mentioned, interactivity of a given script can also be characterized at varying levels of granularity. Thus, like work priority, a given script could have an interactivity value of between 1 and 100, a red/yellow/green scheme, etc. Throttling policies can use interactivity values to throttle applications based on these values. Thus, during a period of relatively poor resource health, a script with an interactivity value of 100 may not be throttled at all, a script with an interactivity value of 90 may be throttled for very small periods of time (0.01 second delays, for example), and a script with an interactivity value of 10 may experience relatively heavy throttling (1 second delays, for example). At a later time when the resource is healthier, all of these scripts may be allowed to proceed without delay. The various criteria mentioned herein can also be combined using one or more mathematical functions, e.g., a throttling delay can be computed as a function of multiple criteria including work priority, interactivity, resource health, etc.

Generally, the throttling policy can be implemented as a configurable file that is accessed by the health framework at runtime. However, note that some implementations may hard-code certain aspects of the throttling policy rather than using a configurable file. For example, logic for proceeding for interactive tasks or for high-priority users can be directly encoded in individual binary commands or into the health framework. In such implementations, the corresponding flags can be removed from the configurable file. Likewise, throttling delays can also be encoded into particular binary commands and/or the health framework.

Graphical Interfaces

Some implementations may provide various user interfaces to allow users to control throttling policies, study throttling behavior, etc. For example, interfaces can be provided that allow a user to set various aspects of a throttling policy, e.g., using one or more individual binary commands, a script, a graphical interface, or simply editing a text file used to configure the policy. For example, the data center administrator may have the ability to set a number of destructive (e.g., delete) binary commands that certain users (e.g., tenant admins) can call within a given time period. As another example, the data center administrator may be able to configure various delays according to health status as discussed more below.

Figure 6A:
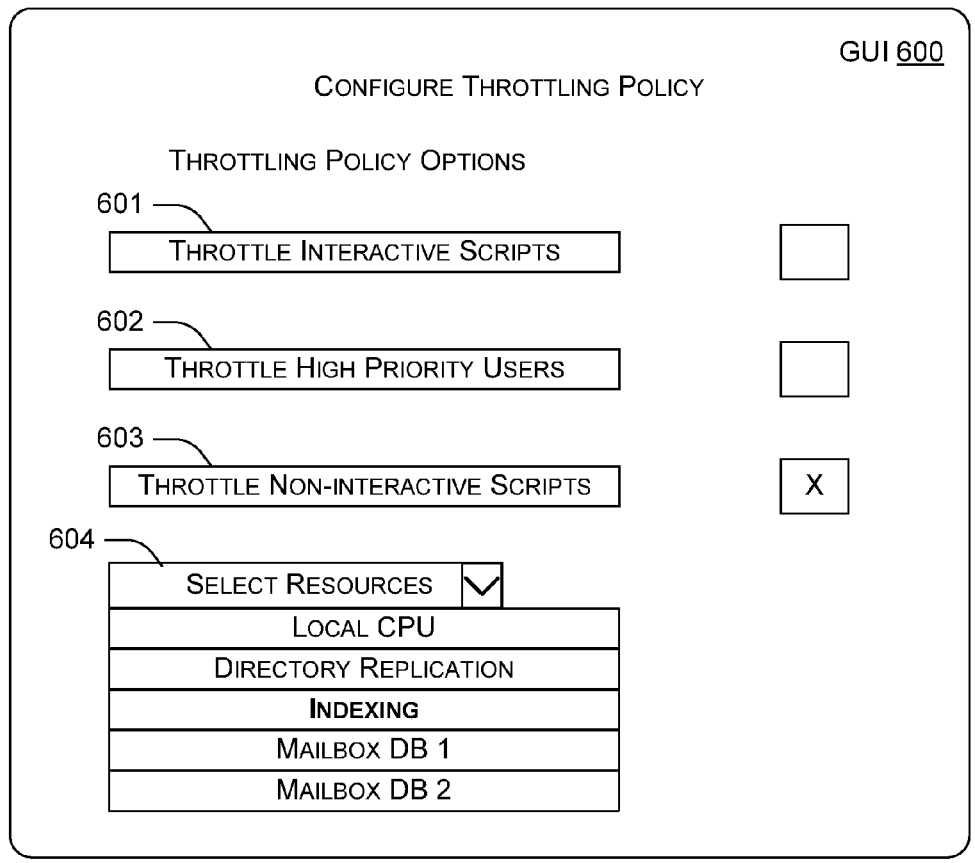
FIGS. 6A, 6B, and 7 show exemplary screenshots of graphical user interfaces that can be provided in accordance with some implementations.

FIG. 6A illustrates an exemplary throttling policy configuration graphical user interface ("GUI") 600 consistent with some implementations. GUI 600 includes various throttling policy options 601-604. For example, GUI 600 includes a throttle interactive scripts option 601, a throttle high priority users option 602, a throttle non-interactive scripts option 603, and a select resources option 604. Options 601-603 can be used to control flags 501-503 of throttling policy 115. FIG. 6A illustrates GUI 600 in a configuration consistent with the throttling policy as illustrated in FIG. 5, e.g., the user has selected only throttle non-interactive scripts option 603 and accordingly this flag is set in throttling policy 115.

Figure 6B:
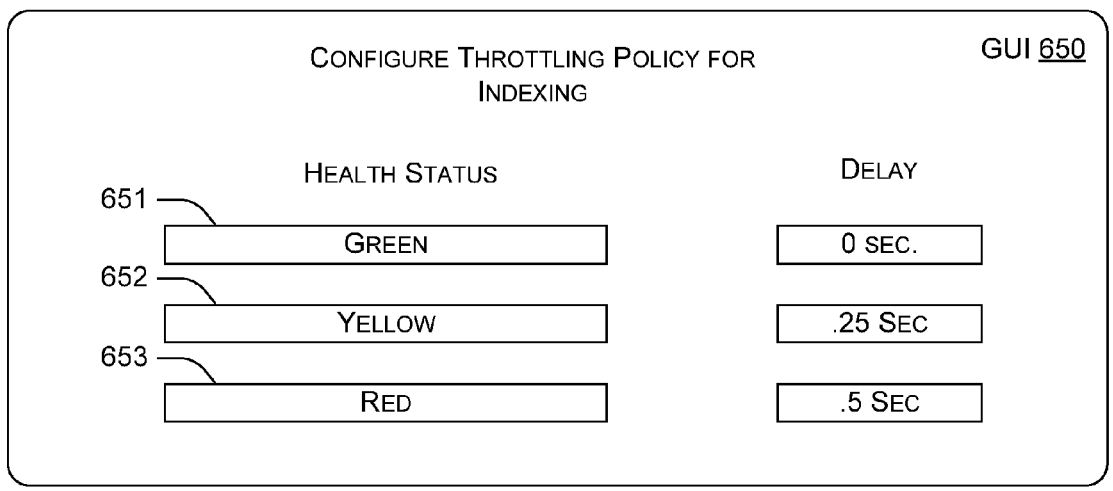

Select resources option 604 is represented as a drop-down menu of various available resources. Here, the user can select to configure the specific throttling delays for a given resource by selecting the resource from the drop-down menu. For example, assume the user selects "indexing" as indicated in bold in FIG. 6A. Responsive to the selection, a throttling delay configuration GUI 650 can be presented to the user. Here, the user can enter associated delays for each individual health status. FIG. 6B illustrates the throttling delay configuration GUI in a state consistent with the throttling policy as shown in FIG. 5, e.g., the delays entered by the user in GUI 650 can be used to populate the throttling policy as shown in FIG. 5. Generally, GUIs 600 and 650 can be collectively used to generate new files to use as the throttling policy.

Note in some implementations the data center administrator may be allowed to use GUIs 600 and 650 to configure the throttling policy. In contrast, tenant administrators may be prevented from configuring the throttling policy. Some implementations may provide tenant administrators with a separate interface that allows them to view, but not modify, the throttling policy. For example, a particular binary command, e.g., "Get-ThrottlingPolicy" can be provided with permissions for the tenant administrators to call this command. In contrast, a regular user such as someone logged into a shell from a tenant that is not the tenant administrator may be prevented from even viewing the throttling policy.

Figure 7:
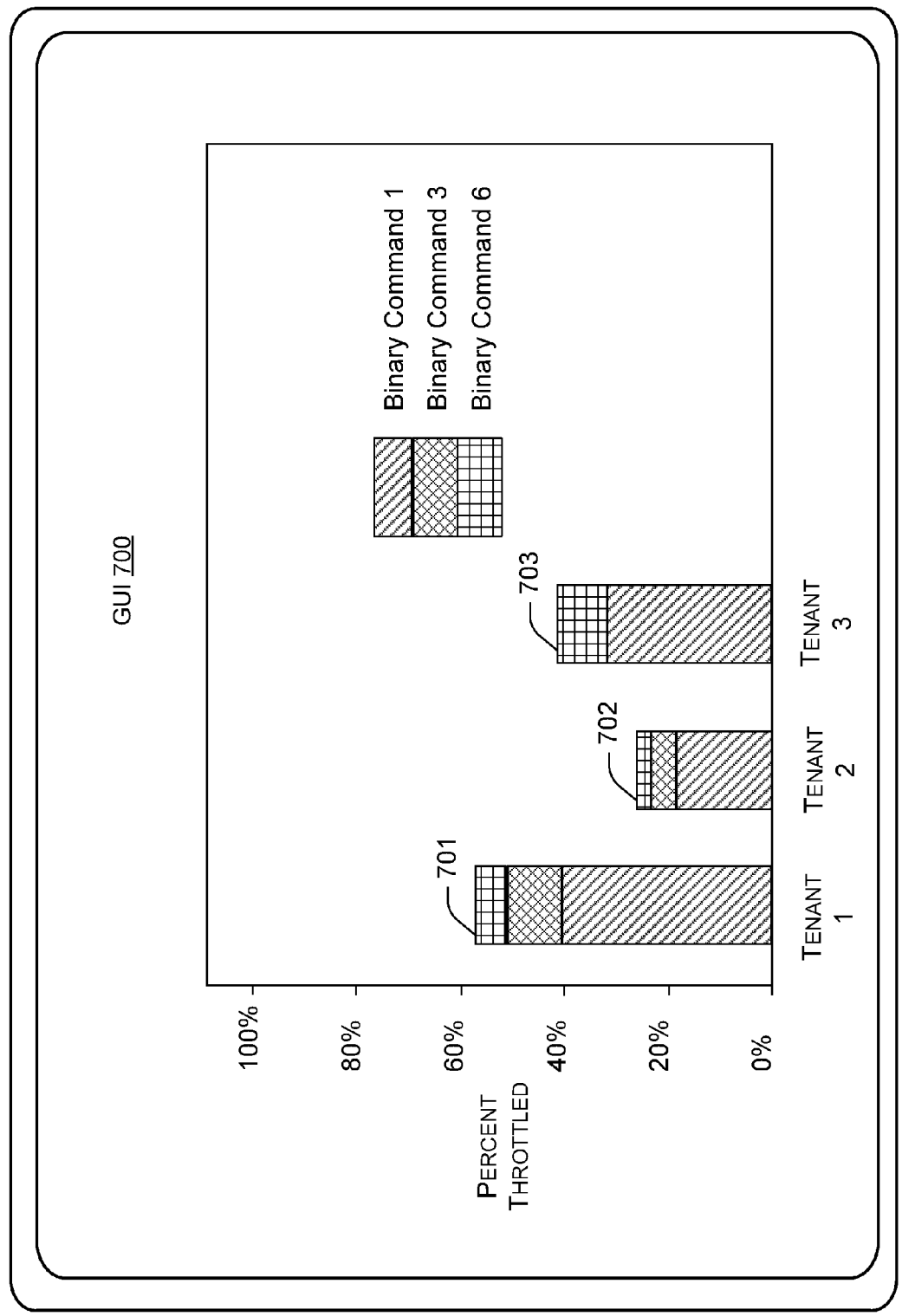

Some implementations can also provide visibility into the effects of different throttling policies. FIG. 7 illustrates an exemplary throttling activity GUI 700 that illustrates three separate bar graphs, a bar graph 701 for a first tenant, a bar graph 702 for a second tenant, and a bar graph 703 for a third tenant. Each bar graph shows the average percentage of time that tenant's scripts are throttled, e.g., over a period of time such as the past month. Each bar graph is broken down into sections showing corresponding binary commands that were throttled in each script. Thus, a user viewing GUI 700 can see that binary command 1 is responsible for a relatively high percentage of all throttling activity in the data center, e.g., binary command 1 is throttled more frequently than binary command 3 and binary command 6. Likewise, the user can see that tenant 1 is responsible for more throttling activity than the other tenants. Generally speaking, outputs of GUI 700 can be used to inform decisions such as how to configure throttling policies, whether to rewrite certain binary commands, where to add hardware resources to the data center, etc.

Script Code Characteristics

From some perspectives, the disclosed implementations can leverage certain characteristics of script code relative to traditional application binaries. An application binary is generally distributed in a "prepackaged" form and stored on a given computing device in this form. Thus, it is possible to analyze usage characteristics of the binary offline and, often, a simple priority scheme can be used to define how large a share of certain hardware resources are accessible to the binary.

In contrast, scripts are generally received in a source code format and compiled after the user requests to run the script. Thus, it is not always the case that a script can be analyzed offline and prioritized accordingly. Many of the disclosed techniques are suitable for implementation at runtime of a given script. Moreover, the disclosed implementations can also leverage certain processing that is performed at runtime for scripts that is generally not performed for conventional application binaries. For example, the script compilation process generally involves parsing the script to identify the individual binary commands referenced therein. This parsing can also be used to gather information about the script to characterize the script as interactive or non-interactive, as previously mentioned.

Furthermore, note that script languages are often used by users such as tenant or data center administrators to write code "on the fly." In contrast, traditional programming languages are generally intended for code that goes through a substantial development and testing cycle before being deployed. Thus, scripts may be more likely to include inadvertent errors. For example, a script may be intended to read only mailboxes for a relatively small group of users, but due to a logical error in the script may inadvertently attempt to read every single mailbox in the data center. By treating such a script as a non-interactive script and throttling the script when certain resources become unhealthy, it is possible to preserve continuity of the user experience for users even while such a script is executing. Furthermore, by periodically stalling the script or individual binary commands, resources can be freed that can allow the bad script to be stopped and rewritten to fix the logical error.

Another aspect of the disclosed implementations is that the resources themselves can "self-protect" because of the throttling scheme. For example, if the directory replication health monitor is consistently finding that the resource is unhealthy, this health monitor can be configured to provide feedback that results in lower utilization of the resource. This could involve, for example, adjusting a formula used to compute the health status so that the health status is reported differently. For example, 80% average CPU utilization across 3 directory replication servers could initially map to a health score of 50. The mapping function can be adjusted to instead report a health score of 30 for 80% CPU utilization. This, in turn, can cause more aggressive throttling to protect those servers from being overloaded. This can be viewed as an alternative to adjusting the throttling policy in some contexts. This ability to self-protect can be particularly useful in computational scenarios involving scripts, because scripting languages can give individuals the ability to quickly develop programs that impose heavy loads on particular resources.

Alternative Implementations

The email provisioning data center example above is but one example of a scenario in which the disclosed concepts can be employed. For example, the disclosed implementations can also be employed in other types of data centers. Consider a data center that performs a web search functionality using voice inputs. Here, the logical resources can include speech recognition, content indexing, etc., that may each have associated computing resources. The disclosed techniques can be implemented in such a data center to throttle speech recognition, content indexing, etc., on an as-needed basis.

Furthermore, the examples above generally showed computing resources as the resources being throttled. However, some implementations may throttle access to other resources as well. For example, one issue in the data center context is the cost and/or availability of electrical power. Electrical power costs can fluctuate at different times of day, seasonally, in response to various events such as natural disasters, storms, etc. It can be cost-efficient in some contexts to schedule non-interactive work at times when power is relatively cheaper. Thus, some implementations may provide a power health monitor that provides power status based on the current cost of power. For example, at times when power is below 6 cents per kilowatt-hour (kWh), the power health monitor may indicate a status of green. Similarly, for power costs from 6 cents to 12 cents, the status may be yellow, and the status can be red for costs over 12 cents.

Another example where the present concepts can be employed is in the context of traffic routing. Generally, in a traffic context, multiple routes can be monitored with different health monitors. For example, in a network context, one route could be a relatively low-latency route between two computing devices (e.g., using a cable modem), and another route may be relatively higher in latency (e.g., using satellite internet). Individual network packets or groups thereof can be classified as interactive or non-interactive based upon the nature of the application or service that sends the packets. When health for the lower-latency route begins to degrade, interactive packets can be scheduled on the lower-latency route whereas higher latency packets can be delayed as discussed above or simply transferred to the alternative, higher-latency route. In this example, communicating each of the individual network packets can be viewed as a work unit for accomplishing an associated task such as a file transfer.

As another example, physical routing of vehicular traffic can be controlled using techniques such as those set forth herein. A given stretch of interstate can be modeled as a resource with an associated health monitor. Some criteria may be associated with different vehicles (e.g., priority based on a payment scheme, multiple passengers, etc.) and some of the vehicles could be delayed based on health of the interstate. In this example, each vehicle can be considered an independent task and the work units can represent different legs of a route on which the vehicle is travelling.

Example System

Figure 8:
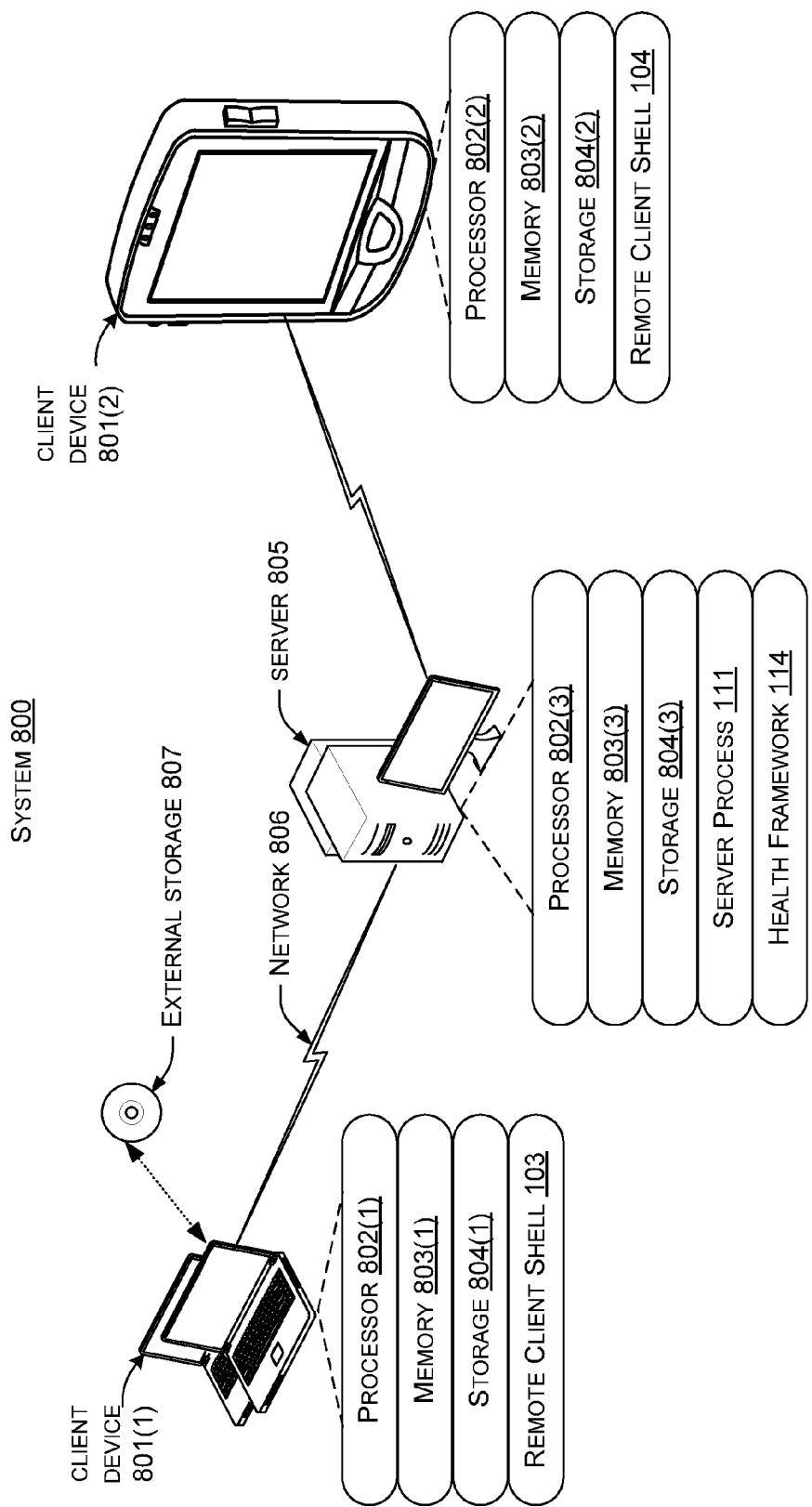

FIG. 8 shows an example of another system 800 where throttling techniques such as those discussed above can be performed. System 800 is shown to focus on hardware that can be used to accomplish the techniques set forth herein, and thus system 800 is not necessarily different than system 200. Rather, system 800 is a general example of a hardware configuration that can be used to implement system 200 and/or other systems consistent with the disclosed implementations.

Example system 800 includes one or more client device(s) 801, shown as a notebook client device 801(1) and a mobile client device 801(2), respectively. In this case, client device(s) 801 can each include a processor 802, memory 803, and storage 804. Note the suffix '(1)' is utilized to indicate an occurrence of components on client device 801(1) and a suffix '(2)' is utilized to indicate an occurrence of such components on client device 801(2)). Each client device can also include a remote client shell 103/104 that executes on the associated processor.

System 800 can also include one or more server(s) 805. Server 805 can be a computing device that also includes a processor 802(3), memory 803(3), and storage 804(3). Note the suffix (3) is used to indicate an occurrence of a given component on server 810. Certain processing discussed above with respect to FIGS. 1-7 can also be performed by server process 111 and/or health framework 114 executing on processor 802(3). Generally speaking, server 805 can represent any of the devices shown above in FIG. 2 as client interface devices 206, replication devices 208, indexing devices 209, mailbox DB 1 devices 210, and/or mailbox DB 2 devices 211. Thus, server 805 can also be configured with one or more health monitors, administrator shells, etc.

Client device(s) 801 and server 805 can communicate over one or more networks 806, such as, but not limited to, the Internet. Server process 111, health framework 114, remote client shells 103 and/or 104, as well as other functional components shown herein can be implemented as software, hardware, and/or firmware. Processor(s) 802 can execute computer-readable instructions to provide any of the functionality discussed herein, e.g., method 400 and associated processing. Data and/or computer-readable instructions can be stored on memory 803 and/or storage 804. The memory and storage can include any one or more of volatile or non-volatile memory, hard drives, and/or optical storage devices (e.g., CDs, DVDs etc.), among others.

Client device(s) 801 and server 805 can also be configured to receive and/or generate computer-readable instructions from an external storage 807. Examples of external storage 807 can include optical storage devices (e.g., CDs, DVDs etc.), hard drives, and flash storage devices (e.g., memory sticks or memory cards), among others. In some cases, the various functional components discussed herein can be installed on the client devices or server during assembly or at least prior to delivery to the user. In other scenarios, functional components can be installed by the user after delivery, such as a download available over network 806 and/or from external storage 807. Health framework 114 can be manifest as a freestanding application or service, an application module, and/or part of the computing device's operating system.

The health framework 114 discussed herein can achieve the functionality described above relative to FIGS. 1-7. Specifically, the health framework can be configured to perform method 400 and the associated processing described herein. It is also worth noting that in some instances, the client devices or servers can comprise multiple computing devices or machines, such as in a distributed environment. In such a configuration, method 400 can be implemented using distributed processing across the multiple computing devices or machines.

The terms "computer," "client device," "server," and "computing device" as used herein can mean any type of device that has some amount of processing capability and/or storage capability. Generally, a "mobile device' refers to a computing device embodied in a form factor suitable for a user to carry on their person. A computing device can obtain computer-readable instructions that are stored on storage and/or memory devices. The storage and/or memory devices can be internal and/or external to the computing device. The storage and/or memory devices can include any one or more of volatile or non-volatile memory, hard drives, flash storage devices, and/or optical storage devices (e.g., CDs, DVDs etc.), among others. Also, note that the term "system" can refer to a single device or multiple devices.

As used herein, the term "computer-readable media" can include signals. In contrast, the term "computer-readable storage media" excludes pure signals and implies some physical structure. Computer-readable storage media includes "computer-readable storage devices." Examples of computer-readable storage devices include volatile storage media, such as RAM, and non-volatile storage media, such as hard drives, optical discs, and flash memory, among others.

In addition to the illustrated configurations of FIG. 8, computing devices consistent with the disclosed implementations can employ a system on a chip (SOC) type design. In such a case, functionality provided by the computer can be integrated on a single SOC or multiple coupled SOCs. One or more processors can be configured to coordinate with shared hardware, such as memory, storage, etc., and/or one or more dedicated hardware resources, such as hardware blocks configured to perform certain specific functionality. Thus, the term "processor" as used herein can also refer to controllers, microcontrollers, processor cores, or other types of processing devices suitable for implementation both in conventional computing architectures as well as SOC designs. In this context, the term "execute" in association with a processor/processing device can include functionality such as routing data and/or instructions to various dedicated hardware resources. The term "logic" encompasses both hardware modules and software instructions or modules.

CONCLUSION

The order in which the example methods are described is not intended to be construed as a limitation, and any number of the described blocks or steps can be combined in any order to implement the methods, or alternate methods. Furthermore, the methods can be implemented in any suitable hardware, software, firmware, or combination thereof, such that a computing device can implement the methods. In one case, the methods are stored on one or more computer-readable storage media as a set of instructions such that execution by one or more computing devices causes the one or more computing devices to perform the method.

Although techniques, methods, devices, systems, etc., discussed herein are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer system comprising:
  computer-readable logic configured to perform the following acts when executed:
    receiving a request to execute a script, wherein the script is received in a source code format and includes a reference to a binary command;
    determining that the script is not interactive;
    receiving, from the binary command, an identifier of a computing resource utilized by the binary command;
    checking a health monitor associated with the computing resource to determine a health status for the computing resource;
    determining that a throttling policy indicates the script should be delayed, the determination that the throttling policy indicates the script should be delayed comprising comparing the health status to one or more criteria of the throttling policy, and the determination that the throttling policy indicates the script should be delayed being based on the determination that the script is not interactive and on the health status of the computing resource; and
    in response to the determination that the throttling policy indicates the script should be delayed, throttling the script; and
  at least one processing device configured to execute the logic.

2. The computer system of claim 1, wherein the throttling policy specifies a throttling delay and the throttling comprises communicating the throttling delay to the binary command.

3. The computer system of claim 1, wherein the acts further comprise:
  presenting one or more graphical user interfaces having configurable options for setting the throttling policy; and
  configuring the throttling policy according to user inputs received by the one or more graphical user interfaces.

4. The computer system of claim 1, wherein the acts further comprise:
  presenting a graphical user interface reflecting relative frequency with which the binary command is throttled.

5. The computer system of claim 1, wherein the logic is configured to perform the determination that the script is not interactive while the script is currently executing.

6. The computer system of claim 1, wherein the logic is configured to perform the determination that the script is not interactive prior to execution of the script.

7. The computer system of claim 6, wherein the determination that the script is not interactive comprises classifying the script as non-interactive based on a determination that the binary command is classified as a non-interactive binary command.

8. A computer-implemented method comprising:
  receiving a request to execute a computer-readable script, wherein the script includes a reference to a computer-readable command;
  determining that the script is not interactive;
  receiving an identifier of a computing resource utilized by the command;
  determining a health status for the computing resource;
  determining that a throttling policy indicates the script should be delayed, the determination that the throttling policy indicates the script should be delayed comprising comparing the health status to one or more criteria of the throttling policy, and the determination that the throttling policy indicates the script should be delayed being based on the determination that the script is not interactive and on the health status of the computing resource; and
  in response to the determination that the throttling policy indicates the script should be delayed, throttling the script.

9. The method of claim 8, wherein the throttling policy specifies a throttling delay and the throttling comprises communicating the throttling delay to the command.

10. The method of claim 8, further comprising:
  presenting one or more graphical user interfaces having configurable options for setting the throttling policy; and
  configuring the throttling policy according to user inputs received by the one or more graphical user interfaces.

11. The method of claim 8, further comprising:
  presenting a graphical user interface reflecting relative frequency with which the command is throttled.

12. The method of claim 8, wherein the determination that the script is not interactive is performed while the script is currently executing.

13. The method of claim 8, wherein the determination that the script is not interactive is performed prior to execution of the script.

14. The method of claim 8, wherein the command is a binary command and wherein the determination that the script is not interactive comprises classifying the script as non-interactive based on a determination that the binary command is classified as a non-interactive binary command.

15. One or more computer-readable storage media comprising instructions which, when executed by one or more processors, cause the one or more processors to perform acts comprising:
  receiving a request to execute a computer-readable script, wherein the script includes a reference to a computer-readable command;
  determining that the script is not interactive;
  receiving an identifier of a computing resource utilized by the command;
  determining a health status for the computing resource;
  determining that a throttling policy indicates the script should be delayed, the determination that the throttling policy indicates the script should be delayed comprising comparing the health status to one or more criteria of the throttling policy, and the determination that the throttling policy indicates the script should be delayed being based on the determination that the script is not interactive and on the health status of the computing resource; and
  in response to the determination that the throttling policy indicates the script should be delayed, throttling the script.

16. The one or more computer-readable storage media of claim 15, wherein the throttling policy specifies a throttling delay and the throttling comprises communicating the throttling delay to the command.

17. The one or more computer-readable storage media of claim 15, wherein the acts further comprise:
  presenting one or more graphical user interfaces having configurable options for setting the throttling policy; and
  configuring the throttling policy according to user inputs received by the one or more graphical user interfaces.

18. The one or more computer-readable storage media of claim 15, wherein the acts comprise performing the determination that the script is not interactive while the script is currently executing.

19. The one or more computer-readable storage media of claim 15, wherein the acts comprise performing the determination that the script is not interactive prior to execution of the script.

20. The one or more computer-readable storage media of claim 15, wherein the command is a binary command.

* * * * *